United States Patent
Ellis et al.

(10) Patent No.: US 10,466,780 B1
(45) Date of Patent: Nov. 5, 2019

(54) SYSTEMS AND METHODS FOR EYE TRACKING CALIBRATION, EYE VERGENCE GESTURES FOR INTERFACE CONTROL, AND VISUAL AIDS THEREFOR

(71) Applicant: Pillantas Inc., Redwood City, CA (US)

(72) Inventors: Stephen R. Ellis, Oakland, CA (US); Matthew D. Moller, Petaluma, CA (US); Botond Bognar, Budapest (HU)

(73) Assignee: Pillantas, Redwood City, CA (US)

( * ) Notice: Subject to any disclaimer, the term of this patent is extended or adjusted under 35 U.S.C. 154(b) by 0 days.

(21) Appl. No.: 15/849,394

(22) Filed: Dec. 20, 2017

Related U.S. Application Data

(63) Continuation-in-part of application No. 15/335,262, filed on Oct. 26, 2016.

(60) Provisional application No. 62/246,200, filed on Oct. 26, 2015, provisional application No. 62/436,860, filed on Dec. 20, 2016, provisional application No. 62/478,315, filed on Apr. 19, 2017, provisional application No. 62/490,032, filed on Apr. 26, 2017, provisional application No. 62/490,037, filed on Apr. 26, 2017, provisional application No. 62/490,197, filed on Apr. 26, 2017, provisional application No. 62/512,389, filed on May 30, 2017, provisional application No. 62/557,302, filed on Sep. 12, 2017, provisional application No. 62/588,735, filed on Nov. 20, 2017, provisional application No. 62/588,851, filed on Nov. 20, 2017, provisional application No. 62/608,288, filed on Dec. 20, 2017.

(51) Int. Cl.
*G06F 3/01* (2006.01)
*G06T 7/50* (2017.01)

(52) U.S. Cl.
CPC .............. *G06F 3/013* (2013.01); *G06T 7/50* (2017.01); *G06T 2207/30201* (2013.01)

(58) Field of Classification Search
CPC ....... G06F 3/012; G06F 3/013; G06F 3/04845
See application file for complete search history.

(56) References Cited

U.S. PATENT DOCUMENTS

| | | | |
|---|---|---|---|
| 5,583,795 A | * | 12/1996 | Smyth .................. A61B 3/0025 359/630 |
| 7,532,230 B2 | | 5/2009 | Culbertson et al. |
| 8,913,790 B2 | | 12/2014 | Hennessy |
| 8,957,835 B2 | | 2/2015 | Hoellwarth |
| 9,035,955 B2 | | 5/2015 | Keane et al. |
| 9,323,056 B2 | * | 4/2016 | Williams ............. G02B 27/017 |
| 9,442,567 B2 | | 9/2016 | Scott et al. |

(Continued)

OTHER PUBLICATIONS

Crossman, et al., "Feedback control of hand-movement and Fitts' Law", 1983, The Quarterly Journal of Experimental Psychology Section A: Human Experimental Psychology, 35:2, 251-278.

(Continued)

*Primary Examiner* — Kent W Chang
*Assistant Examiner* — Nathaniel P Brittingham
(74) *Attorney, Agent, or Firm* — Royse Law Firm, PC

(57) ABSTRACT

Systems and methods are provided for calibrating eye tracking systems. Eye tracking to objects at known locations allow for the determination of a new calibration. Systems and methods are also provided for controlling human-machine interfaces by gaze gestures based on changes in eye vergence. Visual aids for training to use eye vergence to controls and for other purposes are also provided.

4 Claims, 8 Drawing Sheets

(56) References Cited

U.S. PATENT DOCUMENTS

| | | | |
|---|---|---|---|
| 9,454,225 B2 | 9/2016 | Bychkov et al. | |
| 2004/0240709 A1 | 12/2004 | Shoemaker | |
| 2006/0288312 A1* | 12/2006 | Akiyama | G06F 3/0481 715/856 |
| 2009/0242282 A1* | 10/2009 | Kim | G06F 3/0414 178/18.03 |
| 2011/0019874 A1* | 1/2011 | Jarvenpaa | A61B 3/113 382/103 |
| 2011/0109880 A1* | 5/2011 | Nummela | A61B 3/113 351/210 |
| 2012/0013613 A1* | 1/2012 | Vesely | G06F 3/011 345/419 |
| 2012/0154557 A1* | 6/2012 | Perez | H04N 21/25891 348/53 |
| 2012/0194550 A1* | 8/2012 | Osterhout | G02B 27/0093 345/633 |
| 2012/0206452 A1* | 8/2012 | Geisner | G02B 27/017 345/419 |
| 2012/0257035 A1* | 10/2012 | Larsen | G06F 3/013 348/78 |
| 2013/0050069 A1* | 2/2013 | Ota | G06F 3/011 345/156 |
| 2013/0050432 A1* | 2/2013 | Perez | G02B 27/017 348/47 |
| 2013/0106674 A1* | 5/2013 | Wheeler | G02B 27/017 345/8 |
| 2013/0128364 A1* | 5/2013 | Wheeler | A61B 3/113 359/630 |
| 2013/0176533 A1* | 7/2013 | Raffle | A61B 3/113 351/209 |
| 2013/0241805 A1* | 9/2013 | Gomez | G09G 3/003 345/8 |
| 2013/0300635 A1* | 11/2013 | White | H04N 13/383 345/7 |
| 2013/0321265 A1* | 12/2013 | Bychkov | G06F 3/013 345/156 |
| 2013/0342572 A1* | 12/2013 | Poulos | G02B 27/017 345/633 |
| 2014/0002442 A1* | 1/2014 | Lamb | G06F 3/1431 345/419 |
| 2014/0002444 A1* | 1/2014 | Bennett | G06F 3/012 345/419 |
| 2014/0049452 A1* | 2/2014 | Maltz | G06F 3/013 345/8 |
| 2014/0244009 A1* | 8/2014 | Mestas | A63B 24/0062 700/91 |
| 2014/0306875 A1* | 10/2014 | He | G06F 3/017 345/156 |
| 2014/0361984 A1* | 12/2014 | Kim | G06F 3/013 345/156 |
| 2014/0380230 A1* | 12/2014 | Venable | G06F 3/013 715/781 |
| 2015/0091780 A1 | 4/2015 | Lyren | |
| 2015/0091943 A1* | 4/2015 | Lee | G02B 27/0172 345/633 |
| 2015/0185965 A1* | 7/2015 | Belliveau | G11B 27/007 715/723 |
| 2015/0192992 A1* | 7/2015 | Di Censo | G02B 27/01 345/156 |
| 2015/0234184 A1* | 8/2015 | Schowengerdt | G02B 27/01 345/633 |
| 2015/0248169 A1 | 9/2015 | Abovitz et al. | |
| 2015/0277123 A1* | 10/2015 | Chaum | G02B 27/0093 348/62 |
| 2015/0331485 A1* | 11/2015 | Wilairat | G02B 27/0172 345/156 |
| 2015/0338915 A1* | 11/2015 | Publicover | G06F 21/64 345/633 |
| 2016/0026242 A1* | 1/2016 | Burns | H04N 9/31 345/633 |
| 2016/0179336 A1 | 6/2016 | Ambrus et al. | |
| 2016/0239081 A1 | 8/2016 | Imoto et al. | |
| 2016/0246384 A1 | 8/2016 | Mullins et al. | |
| 2016/0307374 A1* | 10/2016 | Kurz | G06T 19/006 |
| 2016/0371886 A1* | 12/2016 | Thompson | G02B 27/0172 |
| 2017/0023801 A1* | 1/2017 | Hyde | A61B 3/113 |
| 2017/0131764 A1* | 5/2017 | Bognar | G06T 7/50 |
| 2017/0255260 A1* | 9/2017 | Nomura | G06F 3/013 |
| 2017/0329400 A1* | 11/2017 | Noda | G06F 3/013 |
| 2017/0364149 A1* | 12/2017 | Lu | G06F 3/013 |
| 2018/0032131 A1* | 2/2018 | Yasuda | G06F 3/013 |
| 2018/0088676 A1* | 3/2018 | Ach | G06F 3/017 |
| 2018/0120573 A1* | 5/2018 | Ninan | G02B 27/0179 |

OTHER PUBLICATIONS

Hoffman, et al., "Vergence-accommodation conflicts hinder visual performance and cause visual fatigue", Journal of Vision, Mar. 2008, vol. 8, 33.

Ranney, "Mice get under foot", InfoWorld, Aug. 19, 1985.

Rolland, et al., "Head-mounted display systems", Encyclopedia of Optical Engineering DOI: 10.1081/E-EOE-120009801, Taylor & Francis, London, available as early as Jan. 1, 2005, 14 pages.

Zangemeisster et al., "Active head rotations and eye-head coordination", 1981, Annals New York Academy of Sciences, pp. 540-559.

Youcha et al., "Evidence-based practice in biofeedback and neurofeedback", 2008, Association for Applied Psychophysiology and Biofeedback.

PCT/US16/58944, International Search Report and Written Opinion, dated Jan. 13, 2017.

* cited by examiner

SYSTEMS AND METHODS FOR EYE TRACKING CALIBRATION, EYE VERGENCE GESTURES FOR INTERFACE CONTROL, AND VISUAL AIDS THEREFOR

CROSS-REFERENCE TO RELATED APPLICATIONS

This application is a continuation-in-part of U.S. patent application Ser. No. 15/335,262 filed on Oct. 26, 2016 and entitled "Systems and Methods for Eye Vergence Control" which claims priority to U.S. provisional patent application No. 62/246,200 filed on Oct. 26, 2015 and entitled "Eye Controlled Virtual User Interface and Associated Information Structure" which are both incorporated herein by reference in their entireties. This application also claims priority to U.S. provisional patent application No. 62/436,860 filed on Dec. 20, 2016 and entitled "Methods for Eye Vergence Control" which is also incorporated herein by reference in its entirety. This application also claims priority to U.S. provisional patent application No. 62/487,315 filed on Apr. 19, 2017 and entitled "Systems and Methods for Memory Visualization" which is also incorporated herein by reference in its entirety. This application also claims priority to U.S. provisional patent application No. 62/490,032 filed on Apr. 26, 2017 and entitled "Multi-factor Eye Tracking" which is also incorporated herein by reference in its entirety. This application also claims priority to U.S. provisional patent application No. 62/490,037 filed on Apr. 26, 2017 and entitled "Menu Control" which is also incorporated herein by reference in its entirety. This application also claims priority to U.S. provisional patent application No. 62/490,197 filed on Apr. 26, 2017 and also entitled "Menu Control" which is also incorporated herein by reference in its entirety. This application also claims priority to U.S. provisional patent application No. 62/512,389 filed on May 30, 2017 and entitled "Methods to End and Start Manipulation" which is also incorporated herein by reference in its entirety. This application also claims priority to U.S. provisional patent application No. 62/557,302 filed on Sep. 12, 2017 and entitled "Methods for Optimizing HCI via Head, Eye Position Data" which is also incorporated herein by reference in its entirety. This application also claims priority to U.S. provisional patent application No. 62/588,735 filed on Nov. 20, 2017 and entitled "Binocular Linearizing Aggregating Scleral Tracking (BLAST)" which is also incorporated herein by reference in its entirety. This application also claims priority to U.S. provisional patent application No. 62/588,851 filed on Nov. 20, 2017 and entitled "Optical System" which is also incorporated herein by reference in its entirety. This application also claims priority to U.S. provisional patent application No. 62/608,288 filed on Dec. 20, 2017 and entitled "Methods for Eye Vergence Control" which is also incorporated herein by reference in its entirety.

BACKGROUND

Field of the Invention

The invention is in the field of human-machine interfaces and more particularly in the field of user control of real and virtual user interfaces based on tracking eye movements.

Related Art

Augmented Reality (AR) headsets include wearable eyeglasses that include an optical combiner that can act as a transparent screen and are used to produce virtual images that are superimposed over a real-world background. U.S. Pat. No. 9,035,955, invented by Keane et al. and U.S. Patent Application Publication No. 2015/0248169, invented by Abovitz et al. disclose examples of AR glasses.

Virtual Reality (VR) headsets include wearable viewing screens that block out vision of the real world and are used to create a view of a completely synthetic environment. U.S. Pat. No. 8,957,835, invented by Hoellwarth discloses an example of a VR headset.

Mixed Reality (MR) can be thought of as a continuum of user interaction environments that range between a real environment and a totally virtual environment (Milgram & Colquhou, 1999). MR blends virtual worlds with the real world to produce new environments and visualizations where digital objects can appear to interact with the objects of the real world to various amounts, rather than just being passive within the real-world context.

SUMMARY

The present invention provides methods for a person to exert control through eye vergence-based gaze gestures, gestures requiring the simultaneous movement of the pupils toward or away from one another during binocular fixating. These methods can be used to exert control in real space as well as in virtual spaces. These methods require the presence of at least some hardware, including hardware capable of tracking one or both eyes, and hardware for reducing the raw data to information that characterizes where each eye is pointing and for analyzing where in the space the eyes are focused over time, as well as for identifying gaze gestures within that information. Hardware is also necessary for implementing the intended control, whether by rendering a virtual reality differently in response to the gaze gesture, or by similarly triggering actions in the real world such as dimming the room lights, changing a TV channel, or causing a robotic camera to take a picture. Hardware is described herein primarily in terms of head-mounted devices that incorporate all of the components necessary to track eye movement, to track head movement, to render virtual or digital images, and to implement other methods of the invention that detect eye vergence and act accordingly. It will be understood, however, that any, some, or all of these functions can be performed by hardware located off of the person's body.

Methods of the invention are directed to improving calibration accuracy of systems that include binocular eye tracking. As one example, binocular eye trackers, optionally combined with appropriate head tracking, provide position and orientation measurements that can be interpreted in terms of user positions and orientations in physical space, or in a virtual space, in order to be useful as control inputs for human-machine interfaces. The interpretation can be calculated from a calibration that is dependent upon the measurements, knowledge of the geometric positions and pose of the movement sensors, and the true physical positions and pose of tracked objects.

Unfortunately, it is relatively easy to lose the calibration, as for instance, an incidental touch to the eye tracking sensor can cause the established calibration to no longer be valid. In some embodiments, the corrective action can be a lateral or vertical shift in the calibration points. These shifts may be unobtrusively determined through the use of targets of known location in the real or virtual viewing environment.

An exemplary method of the present invention for calibration of an eye tracking system comprises a step of providing a visual aid in a viewer's field of view at a known location relative to the viewer's eyes. The method also comprises a step of recording eye movements of both of the viewer's eyes at least while the visual aid is provided to create a record of the eye movements and a step of identifying within the record a fixation of the eyes on the visual aid. The exemplary method further comprises a step of determining a location of a point of focus for the fixation using an existing calibration, and a step of determining a new calibration from an offset from the location of the point of focus to the known location of the visual aid.

In various embodiments, providing the visual aid can comprise displaying a temporary virtual visual aid for less than 1 second. Providing the visual aid can also include prompting the viewer to hold up a finger, and can also include the viewer holding up the finger, where the finger serves as the visual aid. Identifying within the record the fixation of the eyes on the visual aid can include, in some embodiments, identifying a saccade within the record.

An exemplary system of the present invention comprises an eye tracking system in communication with logic configured to provide a visual aid in a viewer's field of view at a known location relative to the viewer's eyes, record eye movements of both of the viewer's eyes at least while the visual aid is provided to create a record of the eye movements, a step of identifying within the record a fixation of the eyes on the visual aid, a step of determining a location of a point of focus for the fixation using an existing calibration, and a step of determining a new calibration from an offset from the location of the point of focus to the known location of the visual aid. In some embodiments the system further comprises a mapping system configured to map distances to objects in real space in the field of view of the viewer and to provide the mapping information to the logic in order to track a real visual aid.

The present invention is also directed to vergence-based gaze gestures that are useful, for example, for imparting movement to virtual objects in virtual spaces. These gestures avoid difficulties associated with maintaining continuous eye positions. It will be appreciated, of course, that these gestures can also be used as triggers to instigate arbitrary actions, both in virtual and real-world spaces. Vergence-based gestures disclosed herein that cause selected virtual objects to move in a virtual space are techniques that break the continuous feedback control loop between the viewer's eye position and the response of the target. Without such techniques, feedback from the movement of the target can affect eye position which can produce unwanted target instability. Gaze gestures include a vergence step useful for selecting objects, and a vergence pulse useful for imparting movement to virtual objects. Both are useful as well for triggering responses in real and virtual spaces.

Another exemplary method of the present invention is directed to recognizing vergence-based gaze gestures. Such an exemplary method comprises storing an association between an object and a response in a tangible memory device, tracking both of the viewer's eyes to determine a gaze gesture, and then providing the response. Determining the gaze gesture can include tracking both of the viewer's eyes to determine that a focal point of the viewer's eyes in a 3-dimensional space coincides with a location of the object in the 3-dimensional space, and further tracking both of the viewer's eyes to determine a vergence change of the viewer's eyes away from the object and along a line of sight to the object. In various embodiments the vergence change is measured against a relative vergence reference such as a rolling average.

In some of these embodiments, the vergence change is for greater than a threshold period and as such constitutes a vergence step, and in some of these embodiments the response is to show the object is in a selected state such as by a change in brightness or the addition of a glow or highlighting around the object. In other of these embodiments, the vergence change is for less than a threshold period and as such constitutes a vergence pulse. In some of these embodiments the response comprises moving the object along a line of sight of the viewer, and in further embodiments the response can comprise modeling the motion of the object along the line of sight as if the object was subject to an impulse. In some of these embodiments, an amplitude of the impulse is proportional to an amplitude of the vergence change.

The present invention is further directed to virtual visual aids that can be placed proximate to an object in a virtual or real space, that aid a viewer to converge or diverge their eyes in order to trigger a response. This can be used for training purposes, in some embodiments. These visual aids can also be used as targets for a gaze pointer based on head position where holding the gaze pointer for a threshold period of time at different locations on the visual aid triggers different responses. This can be useful as a backup for situations where eye tracking and unreliable.

Still another exemplary method of the present invention, for example for training a viewer to perform gaze gestures involving eye vergence, optionally comprises receiving a selection of an object and then further comprises displaying a virtual aid in the viewer's field of view, and tracking the viewer's eye vergence. In various embodiments the visual aid is a vergence ladder that includes a plurality of visual targets disposed along the viewer's line of sight to an object, such as the selected object, and the visual targets are disposed at intervals along a line, where the line is inclined relative to the viewer's line of sight. A number of the plurality of the visual targets are visible in front of the object, wherein each visual target is associated with a different location in a 3-dimensional space. In some embodiments, a remainder of the visual targets are visible behind the object.

In this exemplary method, tracking the viewer's eye vergence is performed to determine that a focal point of the viewer's eyes in the 3-dimensional space coincides with a location along the inclined line. In some embodiments, the location along the inclined line can be anywhere along the line with in other embodiments the location is one of the plurality of visual targets. Various embodiments of the exemplary method further comprise a step of altering the object in response to determining that the focal point of the viewer's eyes in the 3-dimensional space coincides with the location of one of the plurality of visual targets. For example, altering the object can comprise moving the object forwards or backwards along the viewer's line of sight.

Another exemplary system of the present invention comprises a virtual projection system in communication with an eye tracking system, and logic in communication with both. The virtual projection system, alone or in conjunction with the logic, is configured to display an object and a visual aid proximate to the object in a viewer's field of view, where the visual aid includes a plurality of visual targets disposed along the viewer's line of sight to the object. Further, the visual targets, as displayed, are disposed at intervals along a line where the line is inclined relative to the viewer's line of sight, a number of the plurality of the visual targets are visible in front of the object, and each visual target is associated with a different location in a 3-dimensional space.

The eye tracking system of this exemplary system, alone or in conjunction with the logic, is configured to tracking both of the viewer's eyes to determine that a convergence point of the viewer's eyes in the 3-dimensional space coincides with a location along the inclined line. The logic can optionally also be configured to alter the object in response to the determination that the convergence point of the viewer's eyes in the 3-dimensional space coincides with the location of one of the plurality of visual targets, or the system can further comprise a wireless communication module, such as for Bluetooth, and the logic is configured to communicate a command to alter the object. Systems can also include a server or controller configured to receive the command and configured to alter the object in response thereto.

DETAILED DESCRIPTION OF THE INVENTION

Figure 1:
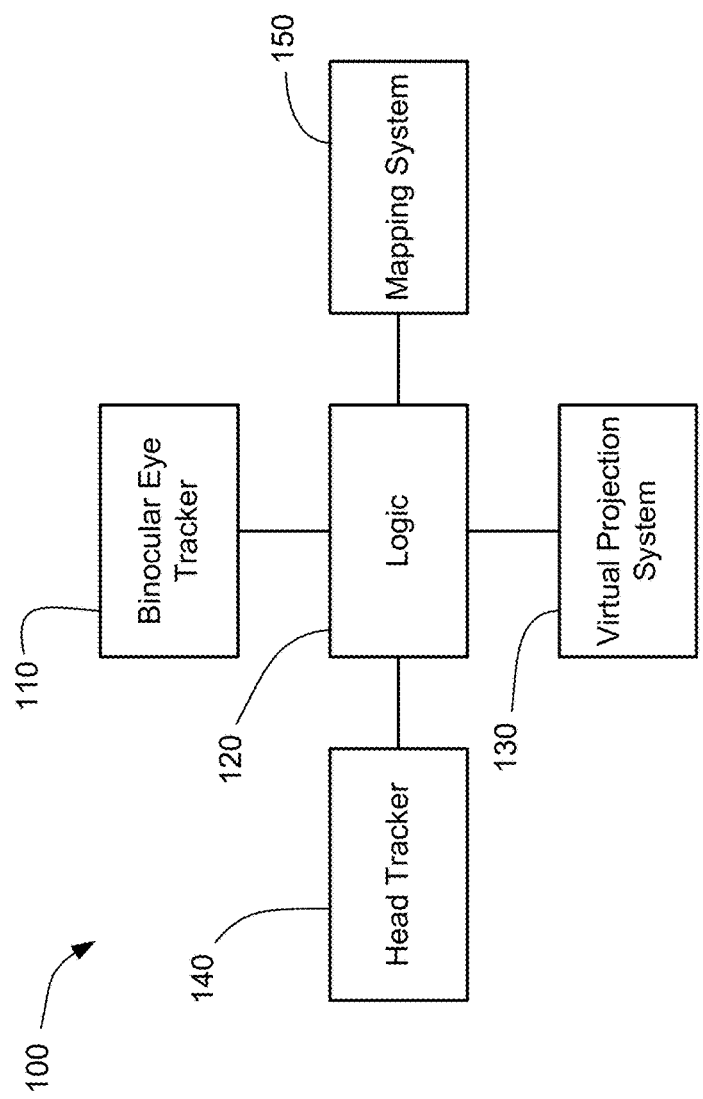
FIG. 1 a schematic representation of a system including eye tracking according to various embodiments of the present invention.

U.S. patent application Ser. No. 15/335,262 describes the use of eye tracking technologies to measure a person's gaze and more particularly their binocular eye vergence, with changes in eye vergence being used for control purposes. This disclosure builds upon the prior application with methods for calibrating eye tracking systems, and systems and methods that employ virtual visual aids and recognize gaze gestures as commands for reducing visual fatigue associated with the use of eye vergence. Since measuring eye vergence is central to the methods and systems described herein, FIG. 1 shows a schematic representation of a system 100 including a binocular eye tracker 110. Eye tracker 110 is configured to view both of a person's eyes and is in communication with a logic 120 that receives an output from the eye tracker 110.

In some systems 100 the eye tracker 110 comprises one or more imaging devices, such as a camera or a high-resolution scanning laser illuminator, that are worn by the person, such as disposed on a helmet or a visor or on a pair of glasses like those disclosed in U.S. provisional patent application No. 62/588,851 filed on Nov. 20, 2017 and entitled "Optical System," and when worn are aimed towards the person's eyes. In other systems 100 the eye tracker 110 comprises one or more imaging devices that are disposed in one or more locations where the person's eyes are sometimes viewable therefrom, such as on a laptop display, near the controls on an appliance, and so forth. It will be appreciated that in various embodiments, capturing the movement of one eye, such as with a monocular eye tracker, in combination with a gaze line defined by head tracking can also be used.

Eye tracker 110 is in communication with logic 120 that is configured to process data received from the eye tracker 110. The data can be received in various forms, depending on whether the eye tracking means includes its own logic to make measurements or whether that function is performed by the logic 120. In the former case, the data received by the logic 120 can be in the form of analog signals or digital data that characterize the gaze, while in the latter case the data received by the logic 120 can be in the form of a video stream, for example.

In some embodiments, data characterizing the gaze can define two lines, one for each eye, in a coordinate system for a space such as for real space or for a virtual space. In these embodiments, eye vergence can be calculated by the eye tracker 110 or the logic 120 as the distance from the midpoint between the person's eyes to the point of their focus, which can be estimated as the point of closest approach (or intersection) between the two lines of the gaze. In other embodiments, data characterizing the gaze can include a measure of the eye vergence (e.g., a distance or angular measure) with a single line for the cyclopian eye, the line that runs from the midpoint between the person's eyes through the point of focus. In embodiments in which the logic 120 receives video, for instance, the logic 120 is configured to extract values characterizing the gaze from the frames of the video using methods such as those described in U.S. provisional patent application No. 62/588,735 filed on Nov. 20, 2017 and entitled "Binocular Linearizing Aggregating Scleral Tracking (BLAST)." Another measure of vergence is the interpupilary distance (IPD) which can be determined as a difference of the pixel location of the pupil in each eye camera image.

Logic as used herein, such as logic 120, can be specialized hardware, programmed firmware, or a combination of a general-purpose processor and software instructions stored in a tangible memory device in communication with the processor, but logic as used herein excludes software only. The communication between the logic 120 and the eye tracker 110 can be wired or wireless, in various embodiments. The logic 120 can be further configured to monitor changes in the eye vergence over time, and to interpret certain changes in the vergence, either alone or in combination with another signal, as a control signal. In various embodiments, the logic 120 includes a separate filter for each gaze gesture.

The logic 120 can optionally be in further communication with a virtual projection system 130 and optionally in further communication with a head tracker 140. As above, these communications can be wired or wireless, in various embodiments. In these embodiments, the virtual projection system 130 can provide a virtual environment for the person and can employ either the logic 120 or other logic (not shown) to determine changes to that environment. Information from the eye tracker 110 can be used by logic 120 or by separate logic of the virtual projection system 130 to determine where the person's gaze is directed within the real or a virtual space, and changes to the person's eye vergence can be interpreted as controls either within the virtual space or for objects in the real world. The head tracker 140 can provide pose information on the position and orientation of the person's head either through the logic 120 or directly to the virtual projection system 130, or both. A gaze pointer can be derived from the head tracker 140 and projected into a virtual space by the virtual projection system 130 in various embodiments.

The virtual projection system 130, in various embodiments, is configured to add visual aids to virtual realities, augmented realities, and mixed realities. An example of a visual aid is a vergence ladder which provides points at varying visual depths for the viewer to focus or fixate upon. The virtual projection system 130 can also generate visual aids at known locations meant to attract eye saccades for the purposes of calibration.

The system 100 can optionally include a mapping system 150 in communication with the logic 120 for mapping the real-world space around the person. Mapping system 150 can optionally include one or more optical cameras, LIDAR, and so forth. The addition of mapping system 150 allows the system 100, through logic 120, for example, to identify objects in the real world in the space around the person, track those objects, and in combination with eye tracker 110 track the person's gaze relative to those objects. Mapping system 150 can be disposed on head gear worn by the person, in some embodiments. In this way, for example, a finger held in front of the person can be mapped by mapping system 150, recognized as a finger, and a distance from the midpoint between the eyes to the finger can be estimated. Object recognition and spatially locating those objects in a coordinate system can be performed by separate logic of the mapping system 150, or by the logic 120 employing data received from the mapping system 150, in different embodiments. It should be noted that the distance to the finger can be established in other ways other than with the mapping system 150.

Figure 3:
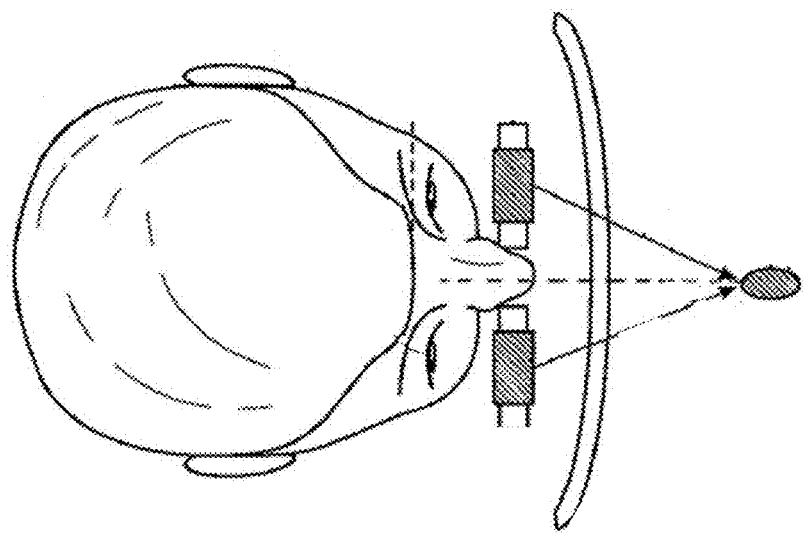
FIGS. 2 and 3 are side and top views, respectively, of a headset, according to various embodiments of the present invention.
Figure 2:
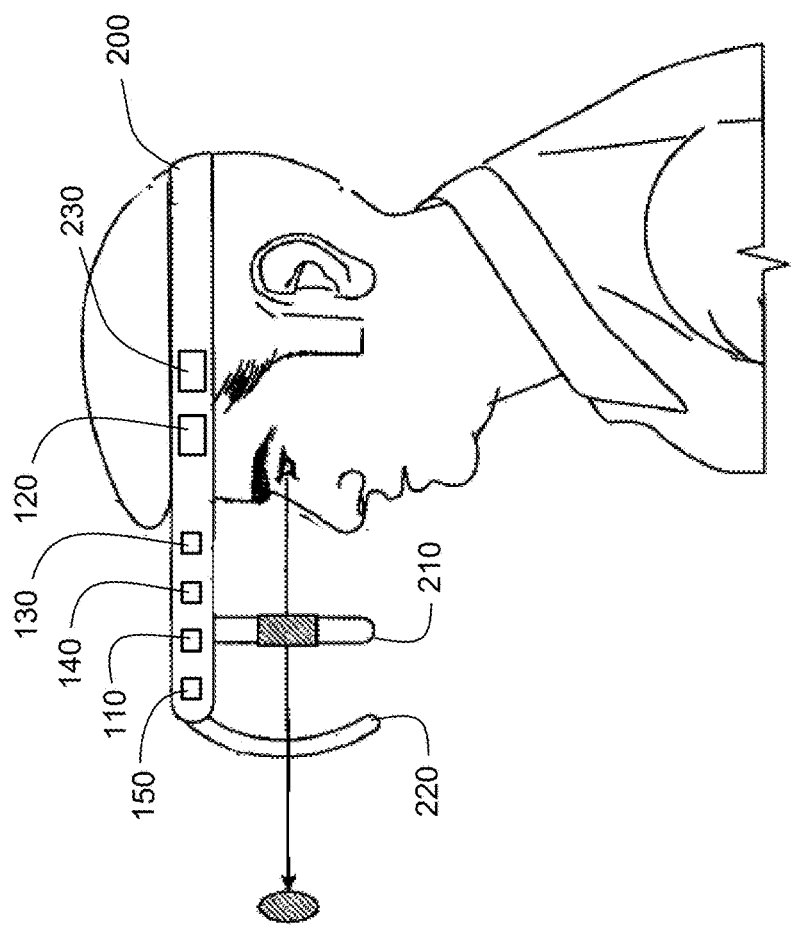

FIGS. 2 and 3 are side and top views, respectively, of an augmented reality headset 200, according to various embodiments of the invention, worn by a person on the head to produce virtual images that augment the viewer's real-world view. This particular embodiment of headset 200 includes a display screen 210 and a protective visor 220. The headset 200 includes eye tracker 110, logic 120, virtual projection system 130, head tracker 140, mapping system 150, a tangible memory device 230, and optionally a wireless interface 240. In this embodiment, the virtual projection system 130 projects a virtual object onto the display screen 210 and the person observes the virtual object to be some distance in front of the display screen 210 and a further distance from the person's eyes. The eye tracker 110 observes the person's eyes when the person focuses on the virtual object and on other features in the virtual space and/or the real world. The augmented reality headset 200 is but one example of a user-worn system, and the display screen 210, visor 220, projection system 130, head tracker 140, and mapping system 150 are all optional. Some embodiments of headset 200 comprise only the eye tracker 110, logic 120, tangible memory device 230, and the wireless interface 240 to communicate with a server (not shown), for example. These embodiments can be used to monitor the person's eyes to detect vergence changes meant to control real world functions through the server in the absence of any virtual spaces.

As such, the person can use eye vergence to implement control of real world objects, such as to dim a light or raise a thermostat, where the server is in communication with the object to be controlled and otherwise configured to operate such real world-objects. In AR, MR, and VR systems, the same eye vergence control can be similarly used to select, manipulate, and otherwise control virtual objects and trigger actions in virtual spaces. Further, methods of the invention described herein are not limited to implementation by head-mounted devices and can also employ back-projected screens for stereoscopic presentations, for example.

More specifically, one aspect of the present invention is directed to calibration methods for eye tracking systems. In some embodiments, a new calibration results in a corrective action that is a lateral or vertical shift, or both, in the calibration points of a prior calibration. These shifts can be unobtrusively determined through the use of targets at known locations in the real or virtual viewing environment. In some embodiments the calibration method prompts the user to fixate on a target at a known position, such as the end of a user's finger which is also being tracked in the space. A measurement by the eye tracking system 110 during the resulting fixation can be used to update the calibration. In other embodiments a temporary visual aid is placed in the field of view at a known location to attract a saccade. In still other embodiments, a persistent object in the field of view at a known location is used for calibration whenever the viewer happens to fixate on it, or fixates on it because the system directs the view to do so.

Figure 4:
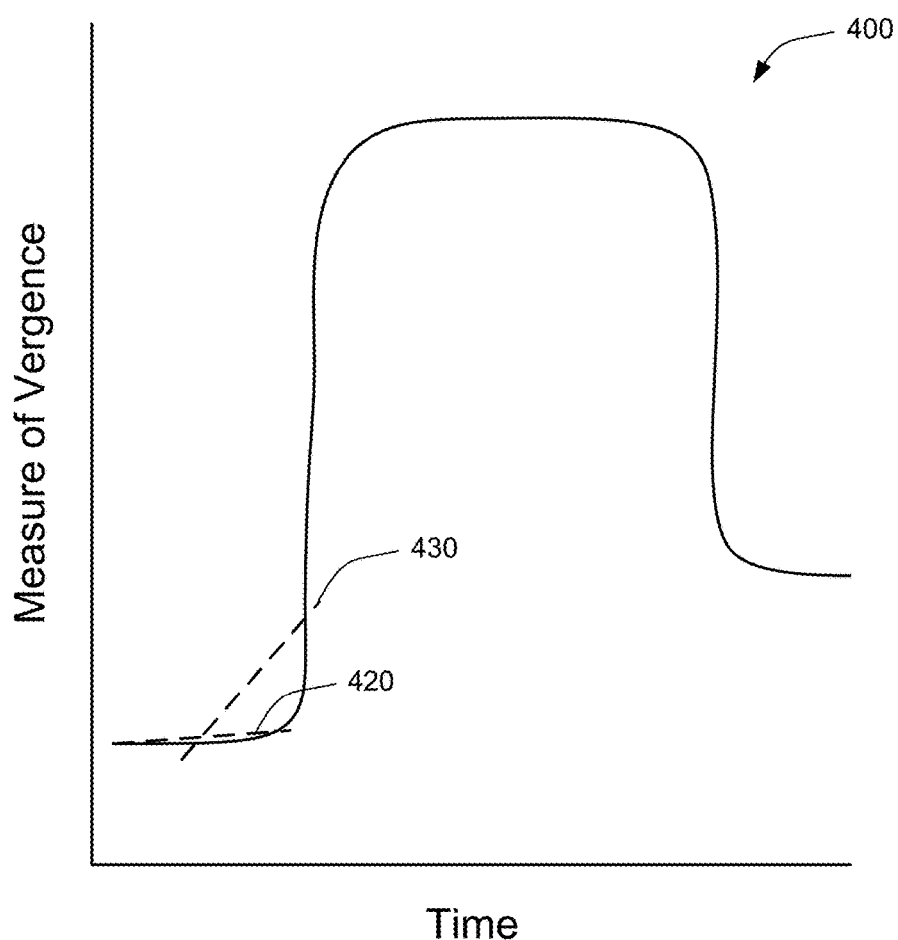
FIG. 4 graphically illustrates a variation of measured vergence for binocular fixation as a person's eyes fixate on objects at various distances.

FIG. 4 shows an exemplary graph 400 of measured vergence 410 of a person's eyes as they fixate from a near object to a far object to one in between, along a line of sight. The measured vergence 410 remains fairly constant while fixation remains on a given object, then shifts quickly to the next object. A simplistic gaze gesture sufficient to trigger a response includes monitoring the measured vergence 410 for a change by more than a threshold distance. Thus, the change from one average measured vergence 410 to another beyond a threshold could be a trigger. A first derivative of the measured vergence 410 as a function of time is approximately zero while the viewer fixates on each object, and either spikes positive or negative when the eyes converge or diverge. Thus, the first derivative, if it exceeds a threshold, or indeed any computable dynamic characteristic of motion, can be another possible trigger. It will be appreciated that the angles each eye defines relative to straight ahead (converging at infinity) is an alternative measure to distance.

Similarly, one can sample measured vergence 410 with a given frequency and create a rolling average of n number of samples, and then monitor the difference between two such rolling averages, where the two rolling averages are offset in time by some number of samples. Such an example is illustrated by lines 420 and 430, and although they are best fits to the curve, one can see how an average of the measured vergence values will change, as will the difference between them. Thus, another trigger can be that the difference between two rolling averages exceeds a threshold.

In further embodiments, the measured vergence data is processed, such as by smoothing, before being analyzed to detect eye vergence. Data processing of the measured vergence data can include applying windowing functions. Further, median values can be used in place of averages. In still further embodiments a second derivative of the measured vergence data is determined and can be used to vary salience values of visual aids, for example. Still another gaze gesture, not based on a change of vergence, and suitable to select a virtual object in a virtual or real space, is for the viewer to simply fixate on the object for a threshold amount of time, which can move the object into a "selected" state. Selection of an object can also be achieved by a versional gaze gesture, sometimes called a "visual swipe," which is a smooth lateral movement of the eyes such that the gaze line moves laterally across the object.

Figure 5:
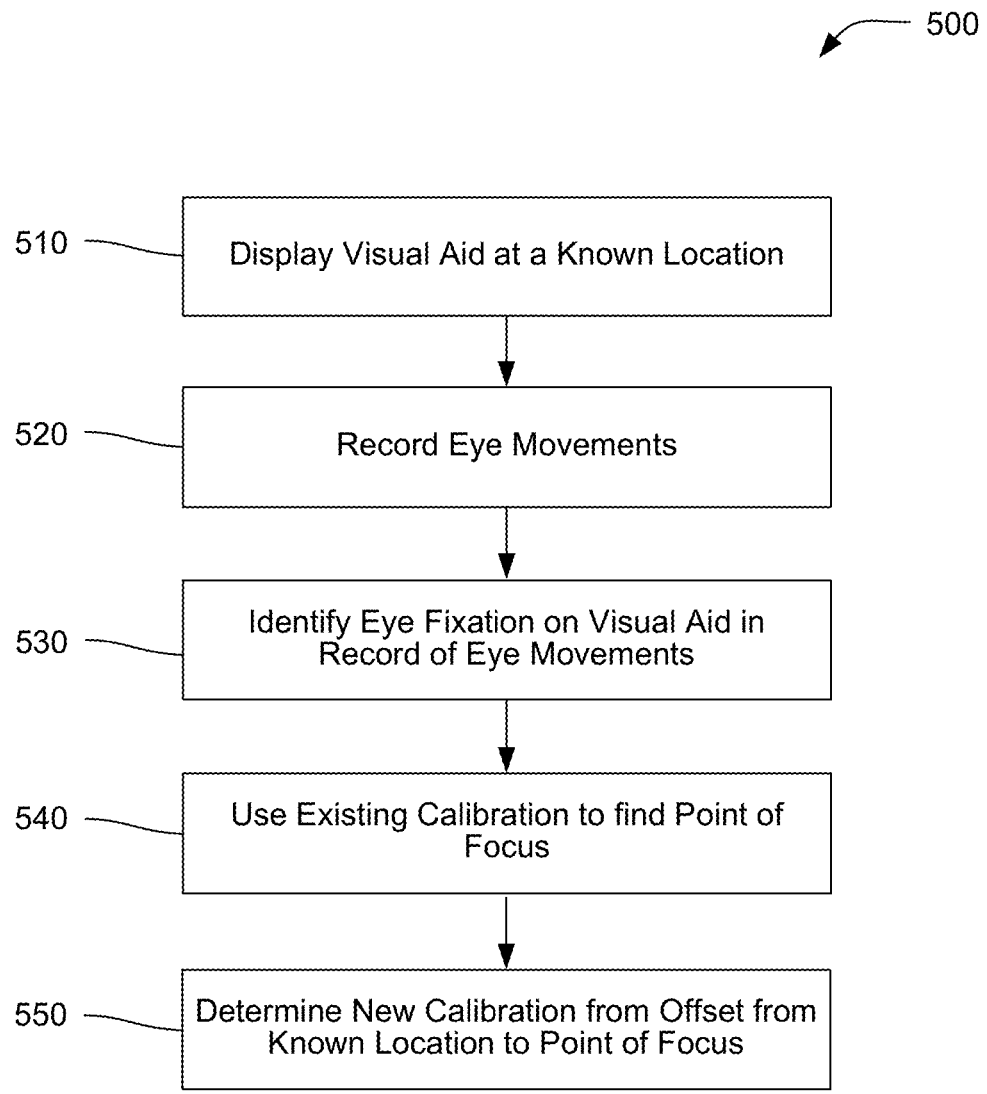
FIG. 5 is a flowchart representation of a calibration method, according to various embodiments of the present invention.

FIG. 5 is a flowchart representation of a calibration method 500 according to various embodiments of the present invention. Calibration method 500 comprises a step 510 of providing a visual aid in a viewer's field of view at a known location relative to the viewer's eyes. In a step 520, eye movements of both of the viewer's eyes, or at least one eye, are recorded at least while the visual aid is displayed. A fixation of the eyes on the visual aid is identified within the record in a step 530. In a step 540, a location of a point of focus for the fixation using an existing calibration is determined, and then in a step 550 a new calibration is determined from an offset from the location of the point of focus to the known location of the visual aid.

In step 510 a visual aid is provided in the viewer's field of view at a known location relative to the viewer's eyes. In various embodiments, visual aids can be virtual objects placed in a virtual space such as by the virtual projection system 130. In the context of the present method 500, visual aids are objects at known locations that a viewer can focus upon. When the viewer focuses on a visual aid at a known location, the line that runs from the midpoint between the person's eyes to the point of focus is known. A visual aid can be provided in the virtual space temporarily, to attract an eye saccade solely for the purpose of calibration, or can be a persistent feature, one that is permanent or semi-permanent that can have a purpose other than calibration. Visual aids can also be real objects in the real world.

An example of a temporary visual aid is a small light subtending a visual angle on the order of about 0.5° with a brightness at least 30% above the background luminance. Such a visual aid can be made to blink or can be otherwise made visually salient to attract a reflexive saccade, one triggered by the appearance of a peripheral stimulus. In various embodiments, the light is disposed within approximately the central 30° of the viewer's field of view, i.e. ±15° surrounding the fovea.

Persistent features at known positions in the virtual space can also serve as visual aids in this context. For instance, where the virtual projection system 130 produces a virtual space including a control panel with buttons, any one of the buttons can serve as a visual aid when the location of the button in the virtual space is known. In some embodiments, the persistent feature has a visual contrast of at least 15% above the immediate background and subtends a visual angle on the order of about 0.5° to 1.0°. In some of these embodiments, the viewer is prompted to operate a visible manually operated switch to produce the preceding targeting saccade.

As noted, real visual aids can also be employed. For example, the viewer can hold a finger in front of their eyes and focus on the finger. In these embodiments, since the visual aid is not produced by the virtual projection system 130 at a known location, the location of the visual aid needs to be found in another manner, such as by the mapping system 150. In some embodiments, the viewer is prompted to hold a finger in front whenever a calibration is required, such as by logic 120 directing virtual projection system 130. Once a distance to a real object is known, such as the distance to one's finger, or to a heads-up display, it can be stored and reused and does not need to be redetermined on each iteration.

It is noted that while the use of temporary visual aids meant to induce a saccade initiates a new calibration only when one of these visual aids is displayed, the use of persistent visual aids allows for the use of fixations other than saccades. Any time the viewer fixates on the persistent visual aid is an opportunity to perform a calibration given that the fixation is caught in the circular buffer. Whenever this happens, the record of the fixation would be already in the circular buffer and only needs to be isolated by a detection filter to determine the calibration offset after the fact. Indeed, if there were a number of such virtual aids that were incorporated into the user interface, they all could be continually used for calibration corrections.

In step 520 eye movements of both of the viewer's eyes are recorded at least while the visual aid is displayed or tracked, to create a record of the viewer's gaze. The record can be, for example, a video segment showing the eyes, or can be information characterizing the gaze derived from monitoring the eyes over at least the period during which the visual aid was displayed or tracked. In various embodiments the record is stored in a tangible memory comprising a circular buffer that retains a brief period of time, such as the last 1-2 seconds of ongoing eye movements. The record can be stored in a memory such as tangible memory device 230 or another memory. The eye movement record can also be stored remotely for possible future analysis.

In step 530 a fixation of the eyes on the visual aid is identified within the record. A fixation, as used herein, is an instance where the eyes focus for at least 150 ms within a small angle, such as less than 1.0°, and narrow range of vergence. This can be achieved, in some embodiments, by identifying a saccadic eye movement within the record by reviewing the record for an instance of a simultaneous movement of both eyes in the same direction from an initial fixation to a new fixation, and back again. In these embodiments, the new fixation is the one identified and used for calibration. In various embodiments, identifying the saccadic eye movement includes identifying a simultaneous movement of both eyes in the same direction from the initial fixation to the pertinent fixation, and back again in a span of less than 20 ms, a span of less than 50 ms, a span of less than 100 ms, or a span of less than 200 ms. In various embodiments, saccadic eye movements are isolated by a detection filter. An example is a high-pass filter that is run on the eye data and that looks for conjugate high frequency movement in both eyes. Where a visual aid has been displayed temporarily, at a known time, identifying the saccadic eye movement can include excluding eye movements that occurred prior to the display of the visual aid, or that occurred prior to a latency period beginning at the time the visual aid is first displayed.

Where a persistent visual aid is employed, it becomes necessary to discern instances in which the viewer's eyes fixate on that visual aid. This can be achieved, for example, by using an object like a button which can be selected. When selected, the viewer is known to be looking at it. In some embodiments, the viewer is prompted to make the selection, while in other embodiments the object is employed with sufficient frequency that prompting is unnecessary. In those embodiments that rely on the viewer fixating on a persistent visual aid, the identification of the fixation can be achieved, for instance, by continuously tracking the position of the viewer's focal point, and recognizing when the focal point is within a threshold distance from a known position of the visual aid under an existing calibration.

In step 540 a location of a point of focus for the fixation is determined using an existing calibration. For a saccadic eye movement, locating the point of focus in the virtual space can be achieved, for example, by determining, using the existing calibration, the location of the new fixation that was briefly held during the saccadic eye movement. In some embodiments in which a persistent visual aid is employed, step 540 is effectively achieved during step 530 when the focal point falls within a threshold of the known position of the visual aid under the existing calibration.

In step 550 a new calibration is defined. This can be achieved, for example, by determining an offset of the measured focal point from the known location of the visual aid. This can be achieved, for example, by subtracting the location of the measured focal point from the known location of the visual aid.

Figures 6, 7:
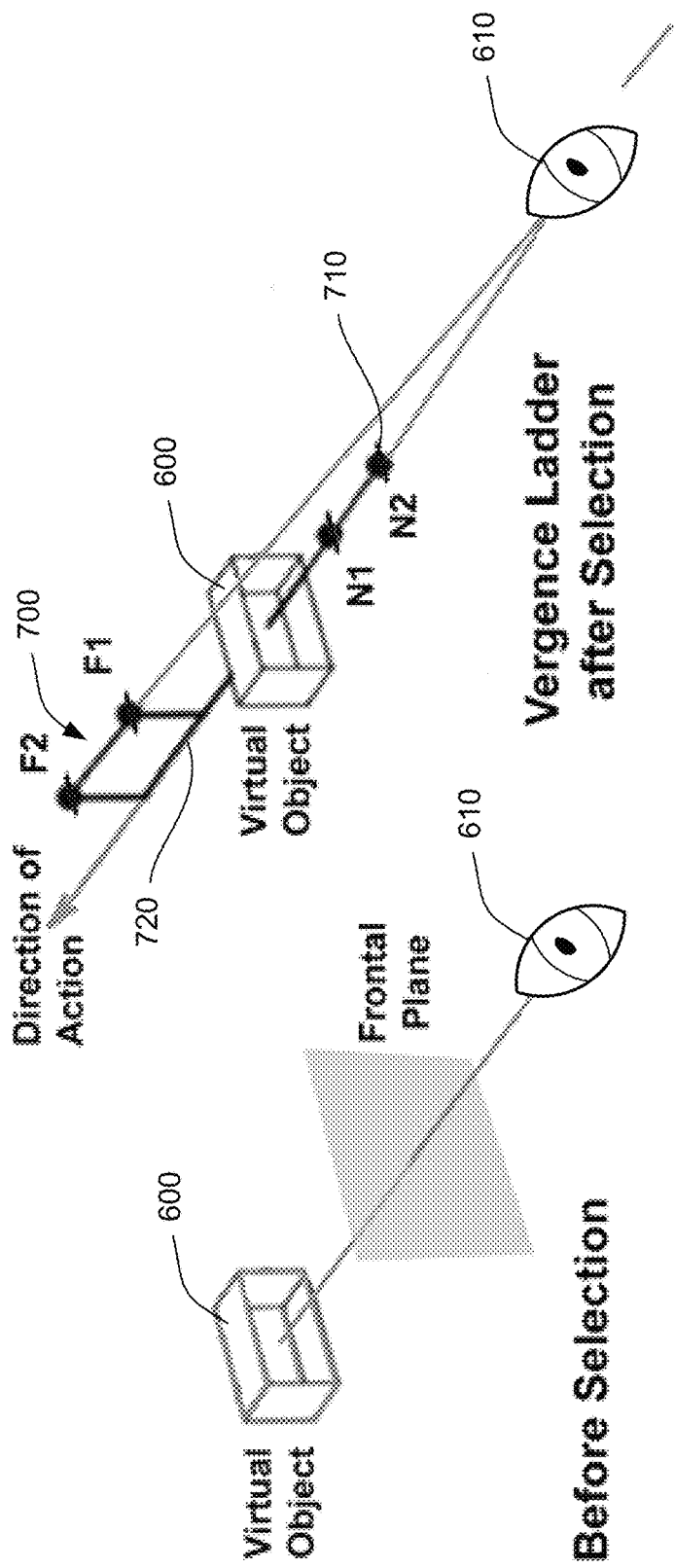
FIG. 6 illustrates a virtual object in a virtual space.
FIG. 7 illustrates a visual aid disposed with the virtual object in the virtual space, according to various embodiments of the present invention.

The remainder of this disclosure is directed to visual aids and gaze gestures based on changes in eye vergence. A first example is a visual aid termed a "vergence ladder" as illustrated by FIGS. 6 and 7. FIG. 6 shows a virtual object 600 in a virtual space observed by an eye 610 (representing both eyes). When the object 600 is selected, such as in a manner outlined with respect to FIG. 4, eye vergence can be used to reposition the object 600 using a vergence ladder 700 displayed proximate to the object 600 to assist the viewer, as shown in FIG. 7. The vergence ladder 700 includes a plurality of rungs 710 that serve as visual targets, disposed at intervals along a line 720. In some embodiments, a number of the plurality of the rungs 710 are visible in front of the object 600 and a remainder of the rungs 710 are visible behind the object 600, where each rung 710 is associated with a different location in the 3-dimensional space and are arranged so that any rungs 710 at a distance behind the object 600 are not blocked by that object 600. In some of these embodiments, the rungs 710 are arranged on another line that is inclined relative to the viewer's line of sight. In some embodiments, only rungs 710 are in front of the object 600 or only behind the object 600.

In FIG. 7, the rungs 710 labelled N1 and N2 are disposed in front of the object 600 in the viewer's field of view. If the viewer focuses on N1 while the object 600 is selected, causing a measurable change in eye vergence, the object 600 can be moved closer to the viewer, while focusing on the closer N2 rung 710 causes a greater change in vergence that can move the object 600 even nearer. Rungs 710 F1 and F2 work similarly to move the object 600 away when selected. The illustrated volumetric expansion of the ladder rungs 710 aids the 3-dimensional triggering fixation. Note also that the vergence ladder 700 should be sufficiently visually salient to be perceptually separable from the surrounding visual context. In FIG. 7 the rungs 710 also include short protrusions that can help attract three-dimensional triggering fixations.

A method of the present invention optionally comprises a step of storing, in a tangible memory device, an association between an object and a response. For example, a response that can be stored in association with an object is a motion for that object, forwards or backwards along a line of sight. For a real object, like a camera, the response can be to trigger the camera's shutter, for example.

A method of the present invention optionally comprises a step of receiving a selection of an object. A virtual object 600 can be selected by a viewer in a manner such as illustrated with respect to FIG. 4. Thus, for example, logic 120 can interpret an eye movement received from eye tracker 110 as a selection of the object 600. In this way the logic 120 receives the selection. In response, the logic 120 can control the virtual projection system 130 to indicate the selection has been made, such as by causing the object to brighten, flash, be surrounded by a glow, etc. Real objects can also be similarly selected in a system 100 that maps the space in front of the viewer, such as with mapping system 150. Selected real objects can be given a virtual enhancement to show the selection to the viewer.

The method further comprises displaying a vergence aid, such as vergence ladder 700, in a viewer's field of view, where the visual aid includes a plurality of visual targets disposed along the viewer's line of sight to an object 600, and those visual targets are disposed at intervals along a line that is inclined relative to the viewer's line of sight and a number of the plurality of the visual targets are made visible in front of the object 600 as seen from the perspective of the viewer. Additionally, each visual target is associated with a different location in a 3-dimensional space within which the object 600 and visual aid are displayed, such as by virtual projection system 130. Further visual targets can be made visible behind the object 600, in some embodiments, while still other embodiments only include visual targets behind the object 600.

It should be noted that in the above example the object 600 is virtual however the invention is not limited to virtual objects 600, as previously noted. As another example, a viewer wearing AR glasses can view a real lamp in a room where the lamp is the object. A virtual projection system 130 of the AR glasses would then display a vergence ladder 700 proximate to the lamp in the viewer's field of view.

In another step of the method, both of the viewer's eyes are tracked, such as by binocular eye tracker 110 in conjunction with logic 120, to determine that a focal point of the viewer's eyes in the 3-dimensional space coincides with a location along the inclined line. Here, "coincide" is given its ordinary meaning of corresponding in position, to meet or intersect, with the understanding that in the present context normal tolerances are allowed, meaning that the focal point meets or intersects the inclined line when it is within some threshold distance thereof, optionally for some latency period. While in some embodiments fixation at any point along the inclined line will trigger a response, which can further be proportional to the change of vergence relative to the vergence at the object, in other embodiments the focal point must coincide with a location of one of the plurality of visual targets in order to trigger the response. In some cases, a visual aid can be rendered partially or fully occluding the target object in order to create a known fixation point in space for relative vergence calculation.

In an optional further step of this method, the object is altered in response to the determination of the coincidence of the convergence point with the visual aid. In some embodiments the object is altered according to the stored response previously stored in association with the object. A virtual object can be altered, for instance, by being repositioned such as forward and back in the viewer's field of view, made to spin, made to progress through a spectrum of colors, become different game characters, and so forth. In the example of the real-world lamp, the brightness of the lamp can be varied according to the point of convergence along the visual aid, which can resemble a slider that varies in brightness, for instance. In this latter example, the system 100 comprises AR glasses further comprising a wireless communication module, such as for Bluetooth, to allow wireless communication with a controller wired to the lamp. Here, the logic 120 of the system 100 sends commands through the wireless communication module to instruct the controller to adjust the lamp's dimmer. It is further noted that the present application encompasses methods for using visual aids as described only during a training period after which the object can be controlled by purposeful eye vergence by the viewer without the visual aid being displayed.

In addition to training purposes, the vergence ladder can also be used in instances which eye tracking information is unreliable such that filters cannot reliably discern vergence gestures. This can be determined, for example, by a real-time assessment of eye tracking signal quality. In these instances, other information, such as head direction as received from head tracker 140, can control a gaze pointer used for system interaction but without eye position information. After a predetermined dwell time for the gaze pointer upon a rung 710, the action otherwise associated with the corresponding relative vergence for that rung 710 is triggered. In further embodiments, a dwell time for the gaze pointer is sufficient to select an object and display a vergence ladder 700.

The vergence ladder 700 described above works well with objects 600 that are within an intermediate distance range from the viewer, however, as objects become closer to infinity, for visual purposes, it becomes increasingly difficult to create a vergence change relative to the reference vergence for pushing the object 600 further away, for example. An offset vergence ladder 700 can be used in these circumstances.

Another method of exerting control using eye vergence is through what is termed a "vergence pulse." A vergence pulse is a brief change in vergence that reverts back to the initial vergence. A vergence pulse can be an increase in the vergence distance (divergence) or a decrease (convergence). In some embodiments, the duration or width of a vergence pulse, as measured from onset to offset, is in the range of 100 ms or longer, such as 150 ms or 200 ms. In various embodiments the width of a vergence pulse is shorter than the dwell time needed for making a selection so that filters detecting both will not trigger falsely.

Figure 8:
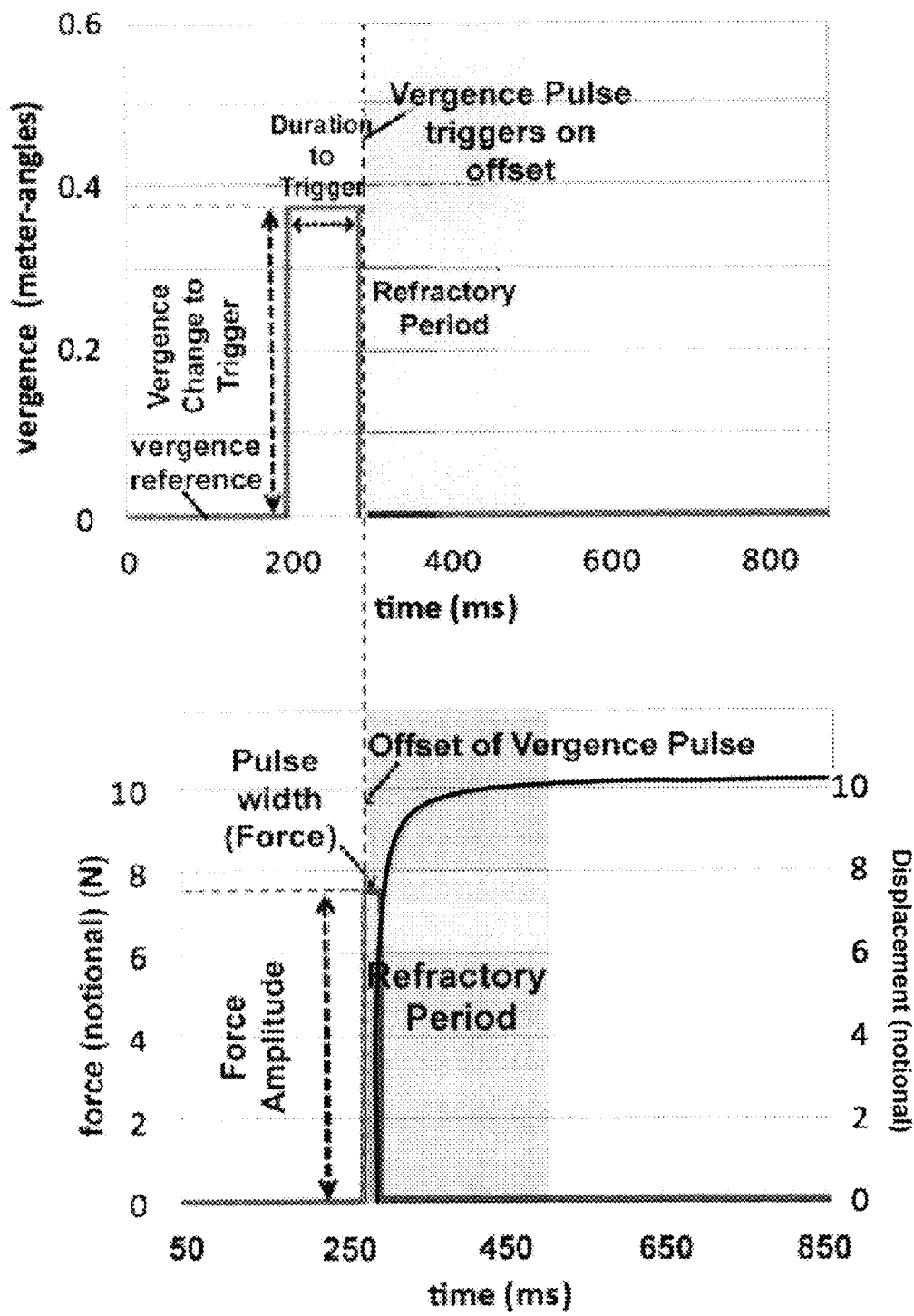
FIG. 8 graphically illustrates a vergence gesture and an effect upon a virtual object in response thereto, according to various embodiments of the present invention.

FIG. 8 illustrates an exemplary vergence pulse and a response to the vergence pulse. In the illustrated example, the viewer's eye vergence changes from a reference for about 75 ms, and then returns to the vergence reference, where the extent of vergence change and limited duration are sufficient to be interpreted as a vergence pulse. The end of the pulse, termed the offset of the vergence pulse, is marked by a vertical line in FIG. 8. The offset is followed by a refractory period, here somewhat more than 200 ms, during which time any further eye movement will not be interpreted.

The detection of a vergence pulse can be may be a filter within logic 120, for example, that monitors gaze information for changes of vergence. Detection of a vergence pulse can induce a change to a selected object 600 along the viewer's line of sight. In the illustrated example of FIG. 8, the object 600 is moved forward or backwards in the viewer's field of view. In various embodiments the object 600 is modeled as being suspended in a viscous medium and subjected to a virtual impulse (here, a force over a time span of about 30 ms) from in front or behind in order to move the object 600. In some embodiments, each vergence pulse imparts a same amplitude impulse to the object 600. In other embodiments, the amplitude of the vergence pulse, that is the magnitude of the change of the vergence, is used to determine an amplitude of the impulse to be applied to the object 600. The object 600 is given a mass and the medium is given a viscosity, and other parameters assigned, and as such, the object 600 can be modeled to respond by moving rapidly as first, then slowing to a stop after some distance, as if subject to the drag of the viscous medium. It is noted that the object 600 responds to the impulse, in various embodiments, regardless of whether the viewer continues to look at the object 600.

Figure 9:
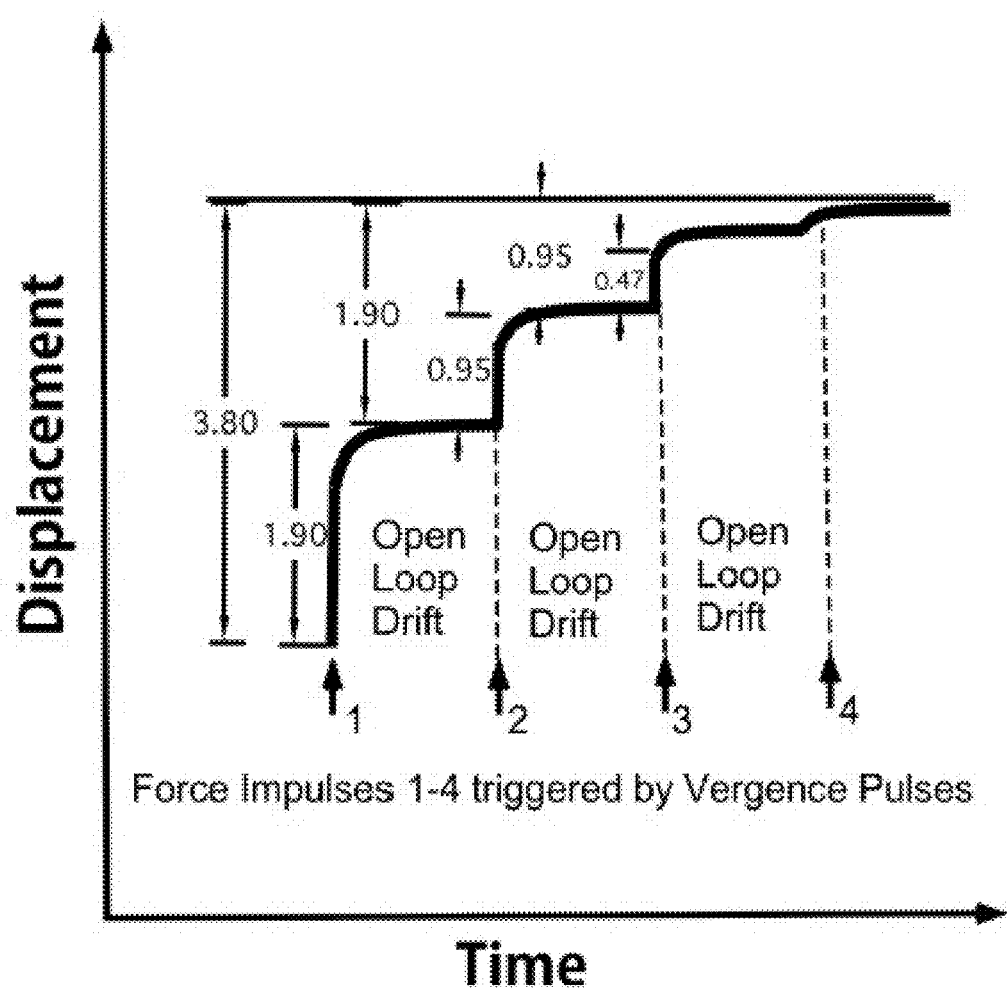
FIG. 9 is a graph showing displacement of an object over time in a virtual space in response to a sequence of vergence pulses, according to various embodiments of the present invention.

FIG. 9 illustrates how multiple vergence pulses can be used in sequence to apply successive impulses to the object 900 in order to achieve a displacement that is larger than that which could be produced by a single impulse. This figure assumes several different impulse amplitudes that can be applied, as discussed above. The process represented in this drawing is an example of pulsitile control in that after the impulse is triggered, the motion of the object 600 is open loop and solely determined by its simulated mass and environmental characteristics such as friction and viscosity. This example illustrates a Fitts' Law-like movement composed of a succession of sub-movements toward a target, each sub-movement's size being a fixed proportion of the remaining distance to the target. Here, the proportionality constant is 0.5. Each sub-movement is produced by an impulse which is triggered by a corresponding vergence pulse. It is noted that many other equations of motion can be used to describe the effect of the impulse, other than those that use $P^r$ order control on the instantaneous remaining distance error between the moving object's location and the target as in Fitts' Law.

Figure 10:
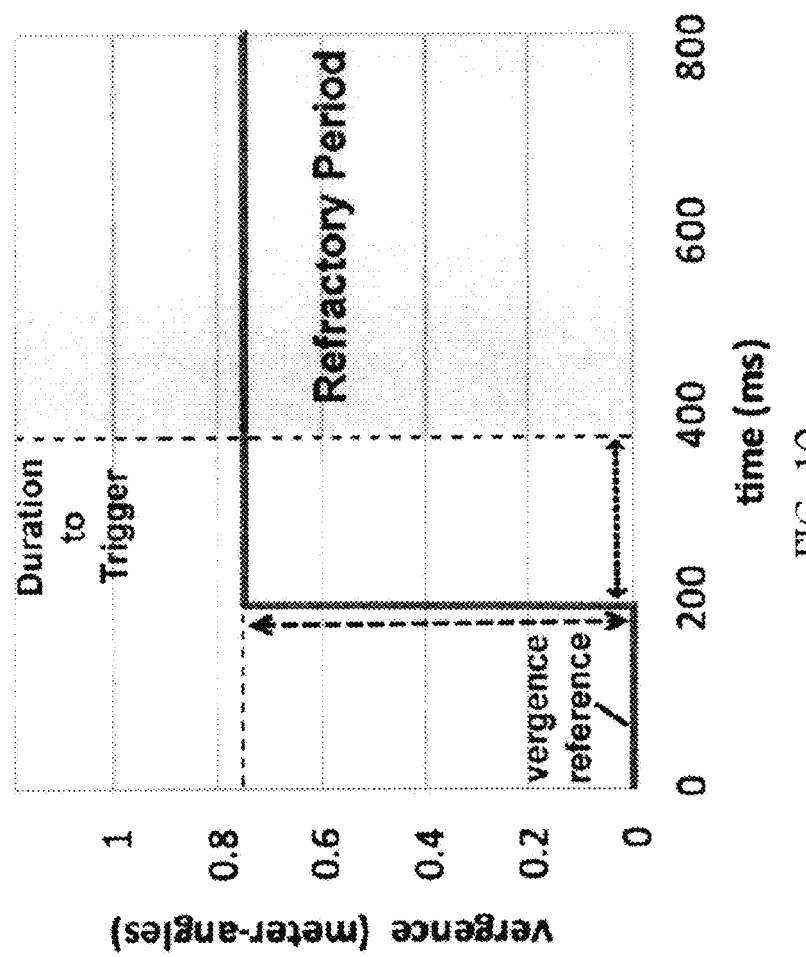
FIG. 10 graphically illustrates another vergence gesture, according to various embodiments of the present invention.

Another gaze gesture useful, for example, for positioning virtual objects in a virtual space is termed a 'vergence step' and is defined with respect to a relative vergence, for instance, measured relative to a moving average of recent vergence measurements within a time window. It is noted that the vergence reference in FIG. 8 can also be a relative vergence. The vergence step is similar to the gaze gesture discussed in step 550 of method 500. FIG. 10 illustrates a vergence step which is gaze gesture achieved by maintaining a change of vergence of at least a threshold difference, with respect to a relative vergence change, and for at least a threshold period if time. If the change of vergence is a convergence, the detected gesture can be interpreted as a pull. If the vergence change is divergent, the detected gesture can be interpreted as a push. This feature resembles the kind of signal sent to computer/human interfaces by computer mice, which are also relative change signals.

In the example of FIG. 10, a vergence change occurs relative to a reference, in this case a moving average over a period of recent vergence measurements, where the change relative to the reference is about 0.75 meter-angles, and the change is maintained relative to the still moving reference for more than 200 ms, at which point a response is triggered. The response can be to push or pull a selected virtual object that is along the viewer's line of sight away or towards the viewer of the virtual space. In some embodiments, the object's movement is maintained for as long as the viewer can maintain a vergence change above the threshold, after the time to trigger has been exceeded.

The descriptions herein are presented to enable persons skilled in the art to create and use the eye vergence controlled systems and methods described herein. Various modifications to the embodiments will be readily apparent to those skilled in the art, and the generic principles defined herein may be applied to other embodiments and applications without departing from the spirit and scope of the inventive subject matter. Moreover, in the following description, numerous details are set forth for the purpose of explanation. However, one of ordinary skill in the art will realize that the inventive subject matter might be practiced without the use of these specific details. In other instances, well known machine components, processes and data structures are shown in block diagram form in order not to obscure the disclosure with unnecessary detail. Identical reference numerals may be used to represent different views of the same item in different drawings. Flowcharts in drawings referenced below are used to represent processes. A hardware processor system may be configured to perform some of these processes. Modules within flow diagrams representing computer implemented processes represent the configuration of a processor system according to computer program code to perform the acts described with reference to these modules. Thus, the inventive subject matter is not intended to be limited to the embodiments shown, but is to be accorded the widest scope consistent with the principles and features disclosed herein.

The foregoing description and drawings of embodiments in accordance with the present invention are merely illustrative of the principles of the invention. Therefore, it will be understood that various modifications can be made to the embodiments by those skilled in the art without departing from the spirit and scope of the invention. The use of the term "means" within a claim of this application is intended to invoke 112(f) only as to the limitation to which the term attaches and not to the whole claim, while the absence of the term "means" from any claim should be understood as excluding that claim from being interpreted under 112(f). As used in the claims of this application, "configured to" and "configured for" are not intended to invoke 112(f).

What is claimed is:

1. A method comprising:
   storing, in a tangible memory device, an association between an object and a response;
   tracking the viewer's eyes to determine that a focal point of the viewer's eyes in a 3-dimensional space coincides with a location of the object in the 3-dimensional space;
   tracking the viewer's eyes to determine a vergence of the viewer's eyes away from the object and along a line of sight to the object; and then
   providing the response, wherein the response comprises moving the object along a line of sight of the viewer, the response comprises modeling the motion of the object along the line of sight as if the object was subject to an impulse, and wherein an amplitude of the impulse is proportional to an amplitude of the vergence.

2. The method of claim 1 wherein the vergence is measured against a relative vergence reference.

3. The method of claim 1 wherein the vergence is for greater than a threshold period.

4. The method of claim 1 wherein the vergence is for less than a threshold period.

* * * * *